United States Patent
McAlister

(10) Patent No.: US 9,377,105 B2
(45) Date of Patent: Jun. 28, 2016

(54) INSERT KITS FOR MULTI-STAGE COMPRESSORS AND ASSOCIATED SYSTEMS, PROCESSES AND METHODS

(71) Applicant: McAlister Technologies, LLC, Phoenix, AZ (US)

(72) Inventor: Roy Edward McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

(21) Appl. No.: 13/797,764

(22) Filed: Mar. 12, 2013

(65) Prior Publication Data

US 2014/0259664 A1 Sep. 18, 2014

(51) Int. Cl.
*F16J 10/04* (2006.01)
*F01B 29/04* (2006.01)

(52) U.S. Cl.
CPC .................. *F16J 10/04* (2013.01); *F01B 29/04* (2013.01); *Y10T 29/49272* (2015.01); *Y10T 29/53* (2015.01)

(58) Field of Classification Search
CPC .... F16J 10/04; F01B 29/04; Y10T 29/49272; Y10T 29/53
USPC .............. 123/193.2, 270, 271, 272, 306, 307, 123/41.72–41.84, 668, 669; 29/888.011
See application file for complete search history.

(56) References Cited

U.S. PATENT DOCUMENTS

| 1,037,437 A | * | 9/1912 | Chase ...................... 123/73 AA |
| 1,310,565 A | | 7/1919 | Grunwald |
| 1,401,612 A | | 12/1921 | Landgrebe |
| 1,451,384 A | | 4/1923 | Whyte |
| 1,693,931 A | | 12/1928 | Lowe |
| 1,765,237 A | | 6/1930 | King |
| 1,773,995 A | * | 8/1930 | Goldsborough ................ 60/620 |
| 2,255,203 A | | 9/1941 | Wiegand |

(Continued)

FOREIGN PATENT DOCUMENTS

| DE | 2410473 A1 | 9/1975 |
| DE | 3151368 A1 | 8/1982 |

(Continued)

OTHER PUBLICATIONS

"Clean, Efficient and Lightweight Propulsion Systems for a Better World," EcoMotors International, Accessed May 19, 2011, http://www.ecomotors.com. 2 pages.

(Continued)

*Primary Examiner* — Jacob Cigna
(74) *Attorney, Agent, or Firm* — Perkins Coie LLP

(57) ABSTRACT

Inserts and insert kits for converting internal combustion engines to multi-stage compressors are disclosed herein. An insert kit in accordance with present technology can include a first insert configured to be positioned at least partially within a first compression cylinder of an engine to reduce the volume by a first amount. A second insert can be configured to be positioned at least partially within a second compression cylinder of the engine to reduce the volume of the second compression cylinder by a second amount, greater than the first amount. Additionally, a first compression piston can be configured to be positioned within the first insert to compress a gas to a first volume. A second compression piston can be configured to be positioned within the second insert to compress the gas to a second volume, smaller than the first volume.

9 Claims, 6 Drawing Sheets

(56) References Cited

U.S. PATENT DOCUMENTS

| | | | |
|---|---|---|---|
| 2,391,220 A | 12/1945 | Beeh | |
| 2,459,286 A | 1/1949 | Rabezzana et al. | |
| 2,826,395 A | 3/1958 | Petty | |
| 3,060,912 A | 10/1962 | May | |
| 3,094,974 A | 6/1963 | Barber | |
| 3,173,409 A | 3/1965 | Warren | |
| 3,266,234 A | 8/1966 | Cook | |
| 3,315,650 A | 4/1967 | Bishop et al. | |
| 3,373,724 A | 3/1968 | Papst | |
| 3,682,142 A | 8/1972 | Newkirk | |
| 3,754,841 A | 8/1973 | Grabb et al. | |
| 3,792,762 A | 2/1974 | Ball et al. | |
| 3,815,555 A | 6/1974 | Tubeuf | |
| 3,829,368 A | 8/1974 | Wesley | |
| 3,830,204 A | 8/1974 | McAlister | |
| 3,908,625 A | 9/1975 | Romy | |
| 3,926,169 A | 12/1975 | Leshner et al. | |
| 3,976,034 A | 8/1976 | Shinohara et al. | |
| 3,980,061 A | 9/1976 | McAlister | |
| 4,003,343 A | 1/1977 | Lee | |
| 4,020,803 A | 5/1977 | Thuren et al. | |
| 4,041,910 A | 8/1977 | Houseman | |
| 4,046,522 A | 9/1977 | Chen et al. | |
| 4,066,046 A | 1/1978 | McAlister | |
| 4,086,877 A | 5/1978 | Henkel et al. | |
| 4,086,878 A | 5/1978 | Eisele et al. | |
| 4,099,489 A | 7/1978 | Bradley | |
| 4,108,114 A | 8/1978 | Kosaka et al. | |
| 4,109,461 A | 8/1978 | Fujitani et al. | |
| 4,111,160 A | 9/1978 | Talenti | |
| 4,140,090 A | 2/1979 | Lindberg | |
| 4,161,657 A | 7/1979 | Shaffer, Jr. | |
| 4,165,616 A | 8/1979 | Pierpoline | |
| 4,181,100 A | 1/1980 | Yamane et al. | |
| 4,211,200 A | 7/1980 | Rocchio et al. | |
| 4,235,533 A | 11/1980 | Norris | |
| 4,244,330 A * | 1/1981 | Baugh et al. | 123/41.84 |
| 4,249,386 A | 2/1981 | Smith et al. | |
| 4,253,428 A | 3/1981 | Billings et al. | |
| 4,340,013 A | 7/1982 | Lindstrom | |
| 4,362,137 A | 12/1982 | O'Hare | |
| 4,373,671 A | 2/1983 | Giardini | |
| 4,376,097 A | 3/1983 | Emelock | |
| 4,381,740 A | 5/1983 | Crocker | |
| 4,382,189 A | 5/1983 | Wilson | |
| 4,408,595 A | 10/1983 | Broyles et al. | |
| 4,418,653 A | 12/1983 | Yoon | |
| 4,441,469 A | 4/1984 | Wilke | |
| 4,442,801 A | 4/1984 | Glynn et al. | |
| 4,475,484 A | 10/1984 | Filho et al. | |
| 4,503,813 A | 3/1985 | Lindberg | |
| 4,515,135 A | 5/1985 | Glass | |
| 4,547,356 A | 10/1985 | Papineau | |
| 4,603,671 A | 8/1986 | Yoshinaga et al. | |
| 4,606,308 A | 8/1986 | Furlong | |
| 4,642,992 A | 2/1987 | Julovich | |
| 4,663,938 A * | 5/1987 | Colgate | 60/620 |
| 4,716,859 A | 1/1988 | Konig et al. | |
| 4,722,303 A | 2/1988 | Leonhard | |
| 4,768,341 A | 9/1988 | Nozaki et al. | |
| 4,783,966 A * | 11/1988 | Aldrich | 60/622 |
| 4,834,033 A | 5/1989 | Larsen | |
| 4,839,247 A | 6/1989 | Levy et al. | |
| 4,918,916 A | 4/1990 | Tiberg | |
| 4,967,708 A | 11/1990 | Linder et al. | |
| 4,971,009 A | 11/1990 | Washino et al. | |
| 4,982,708 A | 1/1991 | Stutzenberger | |
| 5,010,734 A | 4/1991 | Ho | |
| 5,067,467 A | 11/1991 | Hill et al. | |
| 5,108,266 A | 4/1992 | Hewitt | |
| 5,115,771 A * | 5/1992 | Ozawa | 123/41.72 |
| 5,149,600 A | 9/1992 | Yamase et al. | |
| 5,150,668 A * | 9/1992 | Bock | 123/41.8 |
| 5,153,834 A | 10/1992 | Abo et al. | |
| 5,183,011 A | 2/1993 | Fujii et al. | |
| 5,207,185 A | 5/1993 | Greiner et al. | |
| 5,218,941 A | 6/1993 | Suzuki et al. | |
| 5,222,481 A | 6/1993 | Morikawa | |
| 5,228,293 A | 7/1993 | Vitale | |
| 5,229,977 A | 7/1993 | Owen | |
| 5,261,238 A * | 11/1993 | Olsen | 60/620 |
| 5,267,843 A | 12/1993 | Waldrop | |
| 5,279,260 A | 1/1994 | Munday | |
| 5,305,714 A | 4/1994 | Sekiguchi et al. | |
| 5,321,980 A | 6/1994 | Hering et al. | |
| 5,343,699 A | 9/1994 | McAlister | |
| 5,357,908 A | 10/1994 | Sung et al. | |
| 5,394,852 A | 3/1995 | McAlister | |
| 5,399,251 A | 3/1995 | Nakamats | |
| 5,488,932 A | 2/1996 | Serafini | |
| 5,497,744 A | 3/1996 | Nagaosa et al. | |
| 5,505,824 A | 4/1996 | McElroy | |
| 5,512,145 A | 4/1996 | Hollenberg | |
| 5,522,358 A | 6/1996 | Clarke | |
| 5,531,199 A | 7/1996 | Bryant et al. | |
| 5,566,450 A * | 10/1996 | Rao et al. | 29/888.061 |
| 5,632,870 A | 5/1997 | Kucherov | |
| 5,676,096 A * | 10/1997 | Nishi et al. | 123/41.83 |
| 5,692,458 A | 12/1997 | Green | |
| 5,715,788 A | 2/1998 | Tarr et al. | |
| 5,824,890 A | 10/1998 | La Palm et al. | |
| 5,837,110 A | 11/1998 | Dean | |
| 5,899,071 A | 5/1999 | Stone et al. | |
| 5,900,330 A | 5/1999 | Kagatani | |
| 5,910,773 A | 6/1999 | Brownlee | |
| 5,983,855 A | 11/1999 | Benedikt et al. | |
| 5,991,670 A | 11/1999 | Mufford et al. | |
| 6,155,212 A | 12/2000 | McAlister | |
| 6,172,500 B1 | 1/2001 | Bicking | |
| 6,260,546 B1 | 7/2001 | Vaughn | |
| 6,289,869 B1 | 9/2001 | Elliott | |
| 6,341,591 B1 | 1/2002 | Tsutsumi et al. | |
| 6,394,056 B1 | 5/2002 | Woodhouse | |
| 6,446,597 B1 | 9/2002 | McAlister | |
| 6,463,889 B2 | 10/2002 | Reddy | |
| 6,756,140 B1 | 6/2004 | McAlister | |
| 6,787,258 B2 | 9/2004 | Prerad | |
| 6,799,541 B1 | 10/2004 | Clinton et al. | |
| 7,159,544 B1 | 1/2007 | Studdert et al. | |
| 7,191,738 B2 | 3/2007 | Shkolnik | |
| 7,290,506 B2 * | 11/2007 | Rau et al. | 123/41.84 |
| 7,628,137 B1 | 12/2009 | McAlister | |
| 7,785,451 B2 | 8/2010 | Lin et al. | |
| 7,927,434 B2 | 4/2011 | Nakamura et al. | |
| 8,026,288 B2 | 9/2011 | Takenouchi et al. | |
| 2003/0012985 A1 | 1/2003 | McAlister | |
| 2004/0045823 A1 | 3/2004 | Kawase et al. | |
| 2004/0163954 A1 | 8/2004 | Gurry et al. | |
| 2006/0060468 A1 | 3/2006 | Weinand | |
| 2006/0213760 A1 | 9/2006 | Tao et al. | |
| 2007/0062813 A1 | 3/2007 | Gentalen et al. | |
| 2007/0221500 A1 | 9/2007 | Hausselt et al. | |
| 2008/0047831 A1 | 2/2008 | Richert et al. | |
| 2008/0213115 A1* | 9/2008 | Hilger et al. | 417/569 |
| 2009/0065438 A1 | 3/2009 | Chau | |
| 2009/0199828 A1 | 8/2009 | Luttgeharm | |
| 2010/0122688 A1 | 5/2010 | Sihler et al. | |
| 2010/0236648 A1 | 9/2010 | Cheng et al. | |
| 2010/0263619 A1 | 10/2010 | Reymond et al. | |
| 2013/0014517 A1 | 1/2013 | Diederichs et al. | |
| 2014/0261339 A1 | 9/2014 | McAlister | |

FOREIGN PATENT DOCUMENTS

| | | |
|---|---|---|
| DE | 3443022 A1 | 5/1986 |
| FR | 2262195 A1 | 9/1975 |

(56) References Cited

FOREIGN PATENT DOCUMENTS

| GB | 1002694 A | 8/1965 |
|---|---|---|
| GB | 1038490 A | 8/1966 |
| GB | 1336636 A | 11/1973 |
| GB | 2112455 A | 7/1983 |
| KR | 20030047546 | 6/2003 |
| WO | WO-95/27845 A1 | 10/1995 |

OTHER PUBLICATIONS

Collier Technologies Technology Description; "HCNG"; Nov. 2005; 4 pages.
Davis et al., "Fuel Injection and Positive Ignition—A Basis for Improved Efficiency and Economy", SAE Progress in Technology Review vol. II, Society of Automotive Engineers, 1967, pp. 343-357.
Finegold, et al., "Dissociated Methanol as a Consumable Hydride for Automobiles and Gas Turbines", Jun. 1982, pp. 1359-1369.
Finsterwalder, "Deutz Converts Operation by Adding High-Tension Ignition System", Automotive Engineering, Dec. 1971, pp. 28-32.
European Search Report and Written Opinion for EP Application No. 05027548.6; Dated: Mar. 4, 2009; 6 pages.
European Search Report and Written Opinion for EP Application No. 05027548.6; Dated: Sep. 20, 2010; 13 pages.
European Search Report for European Application No. 05027548.6; Date of Mailing: Feb. 11, 2009; 7 pages.
European Search Report for European Application No. 94920655.1; Date of Mailing: Jun. 27, 1997; 9 pages.
James W. Heffel, University of California; "Hydrogen Powered Shelby Cobra: Vehicle Conversion"; 2003; 14 pages.
Jim Stanam; "How Can Engines Be Modified to Run Using Alternative Fuels?"; Lockheed Martin; Orlando, FL; Jan. 2, 1999, 4 pages.
Robert Priest, Appeal T 383/04-3.2.4 in respect of European Patent Application No. 94920655.1-2311 of Roy E. McAlister; "Declaration of Robert Priest"; Nov. 30, 2005; 3 pages.
Schwartz, Ariel, "Bill Gates, Khosla Ventures Inejct $23.5 Million Into Engine Startup EcoMotors," FastCompany, Jul. 12, 2010, Accessed May 31, 2011, http://www.fastcompany.com/1669471/bill-gates-khosla-ventures-inject-235-million-into-efficient-engine-startup-ecomotors. 2 pages.
Simko et al., "Exhaust Emission Control by the Ford Programmed Combustion Process-PROCO", SAE Paper No. 720052, pp. 249-264.
Charles W. Lopez, Kenneth W. Stone; Contractor Report; Performance of the Southern California Edison Company Stirling Dish; Oct. 1993.
International Search Report and Written Opinion for Application PCT/US2014/024943; Applicant McAlister Technologies, LLC; Mail Date Jun. 25, 2014; 18 pages.

\* cited by examiner

INSERT KITS FOR MULTI-STAGE COMPRESSORS AND ASSOCIATED SYSTEMS, PROCESSES AND METHODS

TECHNICAL FIELD

The present disclosure relates generally to insert kits for multi-stage compressors. More specifically, insert kits for converting internal combustion engines to multi-stage compressors are disclosed herein.

BACKGROUND

Compression and/or liquefaction of gases can provide a variety of benefits. For example, compressing natural gas into compressed natural gas increases the energy density and can allow for the storage and transportation of larger amounts of energy. Liquefying natural gas produces an even greater energy density and can similarly provide storage and transportation benefits. Additionally, the compression and liquefaction of other fuels and/or other non-fuel gases (e.g., air, nitrogen, oxygen, helium, etc.) can also provide benefits. For example, liquefied nitrogen can be used in a variety of industrial and manufacturing processes.

Various compressors have been developed to compress and/or liquefy gases. For example, shaft driven compressors, including reciprocating compressors and centrifugal compressors, are often used to compress a gas as part of a liquefaction process. Compressor driven liquefaction systems are generally powered by separate internal combustion engines or electric motors that consume large amounts of energy to drive the compressor. Additionally, liquefaction systems employing shaft driven compressors with separate power sources often occupy large operational footprints.

In view of the benefits provided by compressed and liquefied gases, and the relatively high energy consumption and large size of existing compression systems, it would be advantageous to provide a compressor that has reduced energy consumption and a smaller operational footprint.

BRIEF DESCRIPTION OF THE DRAWINGS

Certain details are set forth in the following description and in FIGS. 1-4 to provide a thorough understanding of various embodiments of the disclosure. Other details describing well-known structures and systems often associated with inserts, compressors, internal combustion engines, heat exchangers, etc., have not been set forth in the following disclosure to avoid unnecessarily obscuring the description of the various embodiments of the disclosure.

Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

Figure 1:
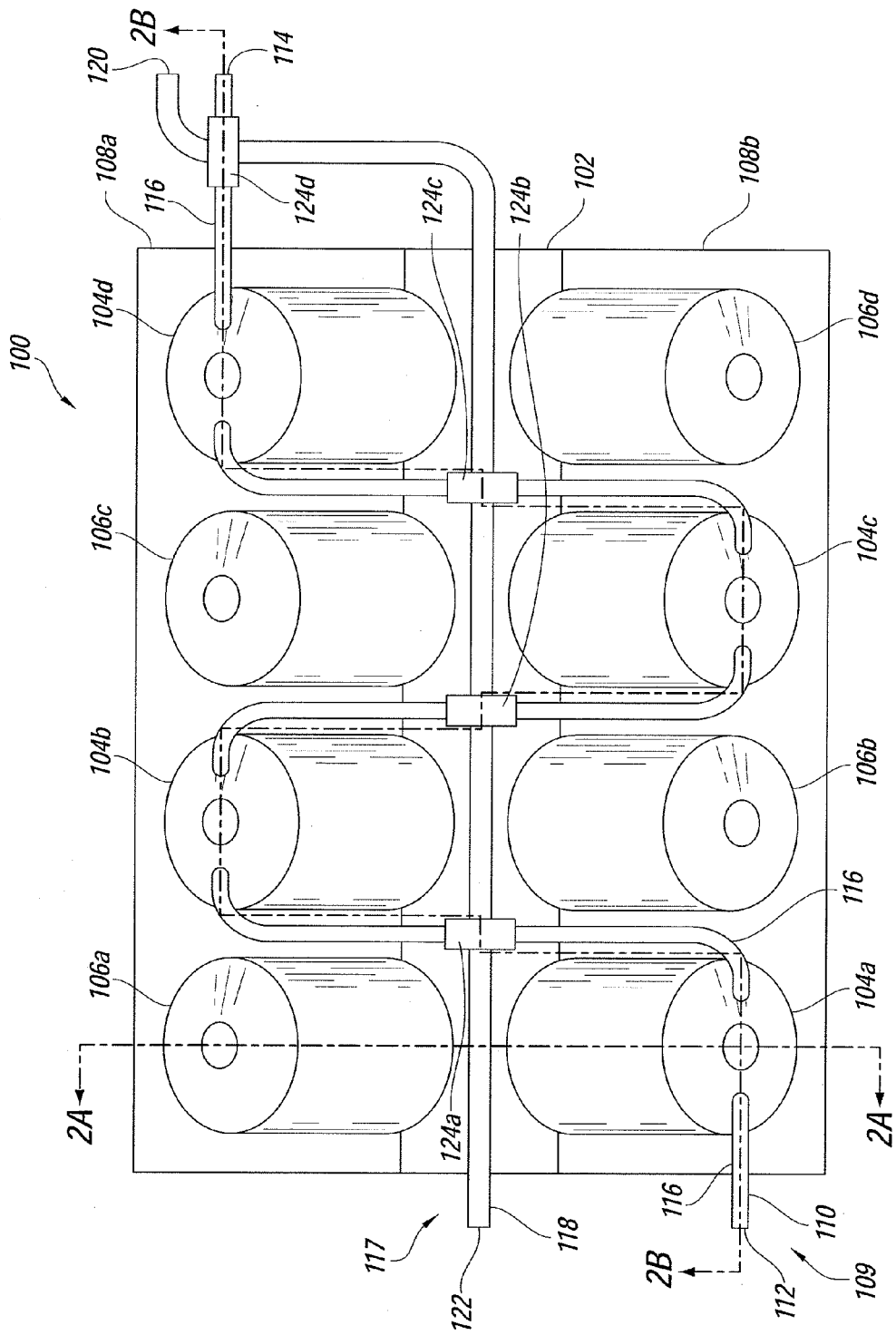

FIG. 1 is a partially schematic, overhead view of a multi-stage compressor configured in accordance with an embodiment of the present technology.

Figure 2A:
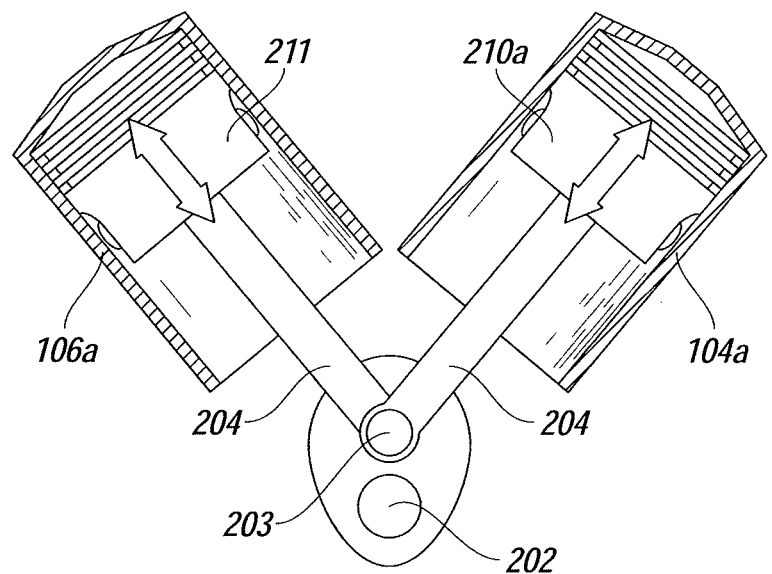

FIG. 2A is a partially schematic, cross-sectional side view of a portion of the compressor of FIG. 1.

Figure 2B:
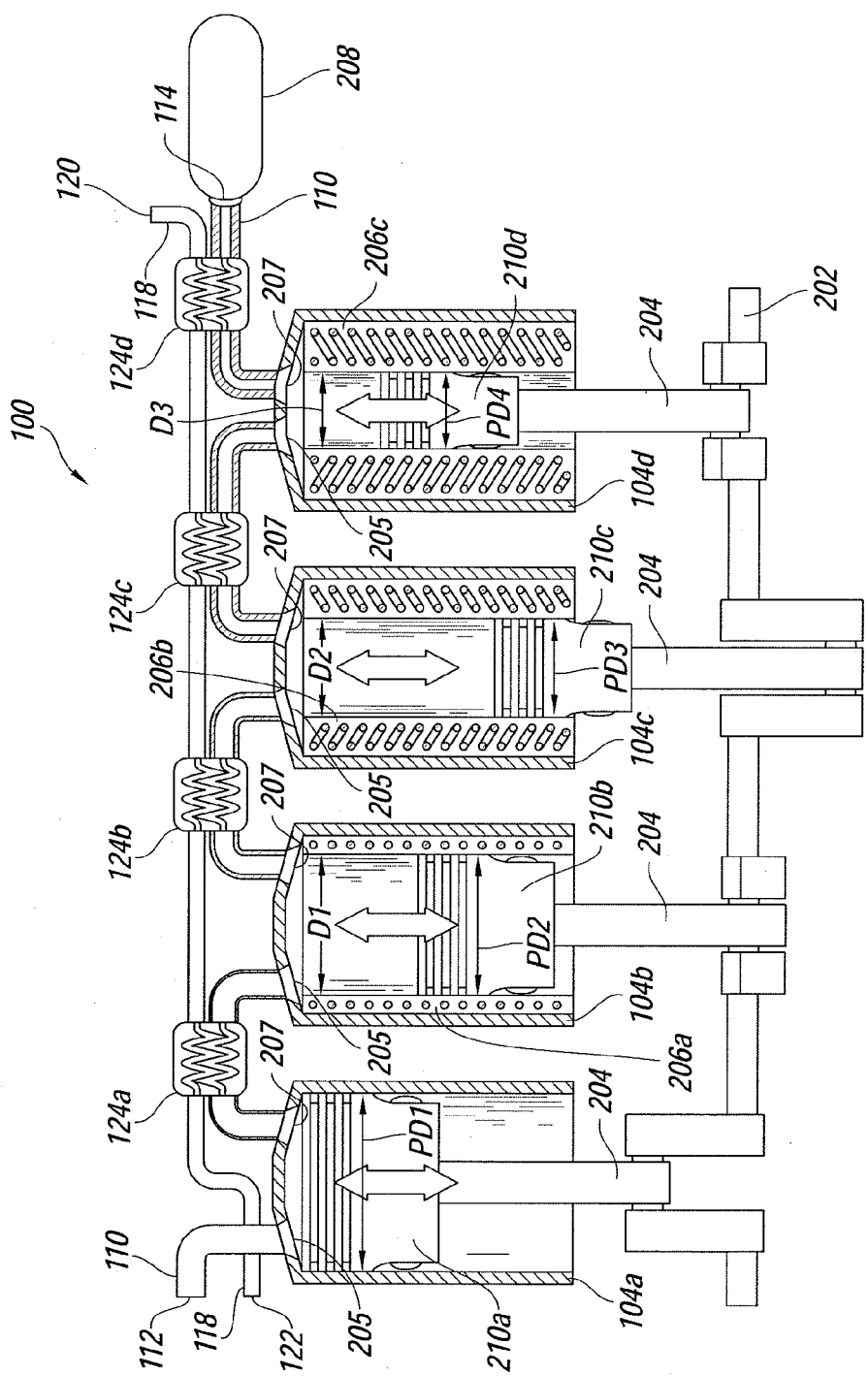

FIG. 2B is a partially schematic, cross-sectional side view of a portion of the compressor of FIG. 1.

Figure 3A:
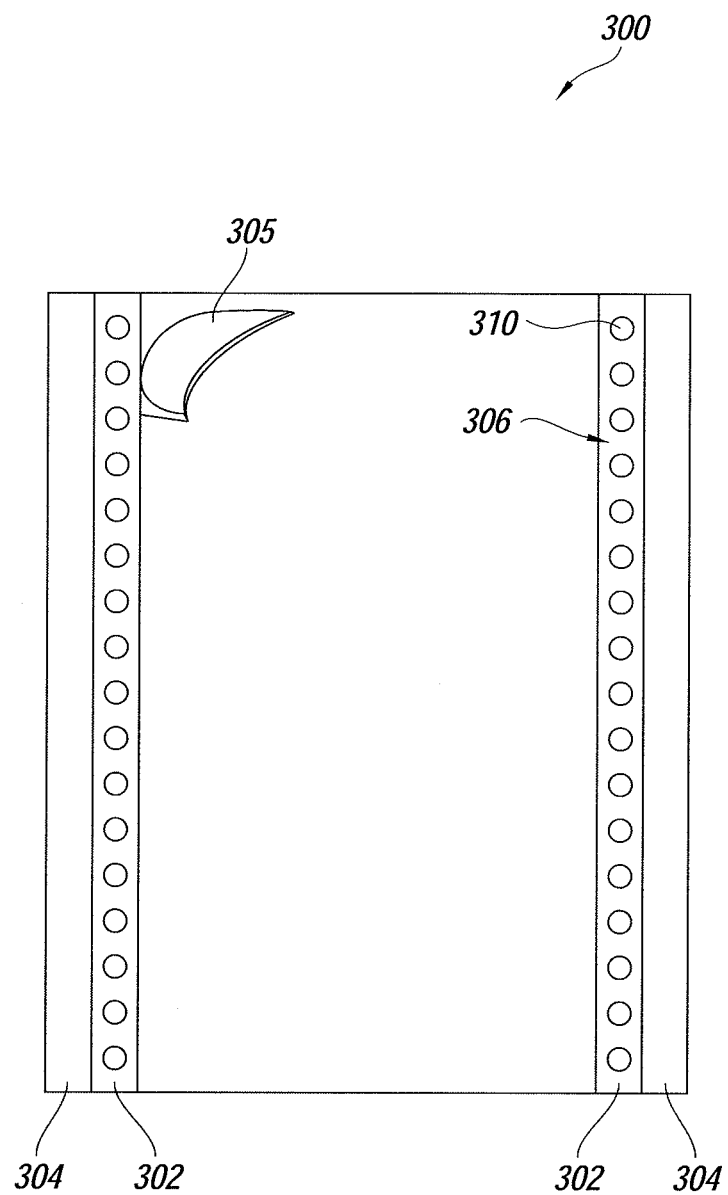

FIG. 3A is a partially schematic, cross-sectional view of an insert configured in accordance with an embodiment of the present technology.

Figure 3B:
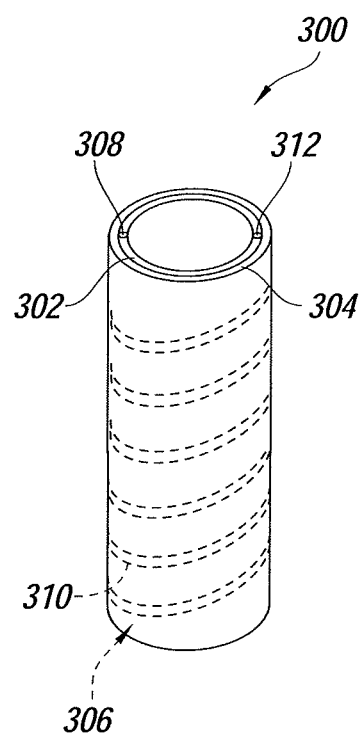

FIG. 3B is an isometric view of the insert of FIG. 3A.

Figure 4:
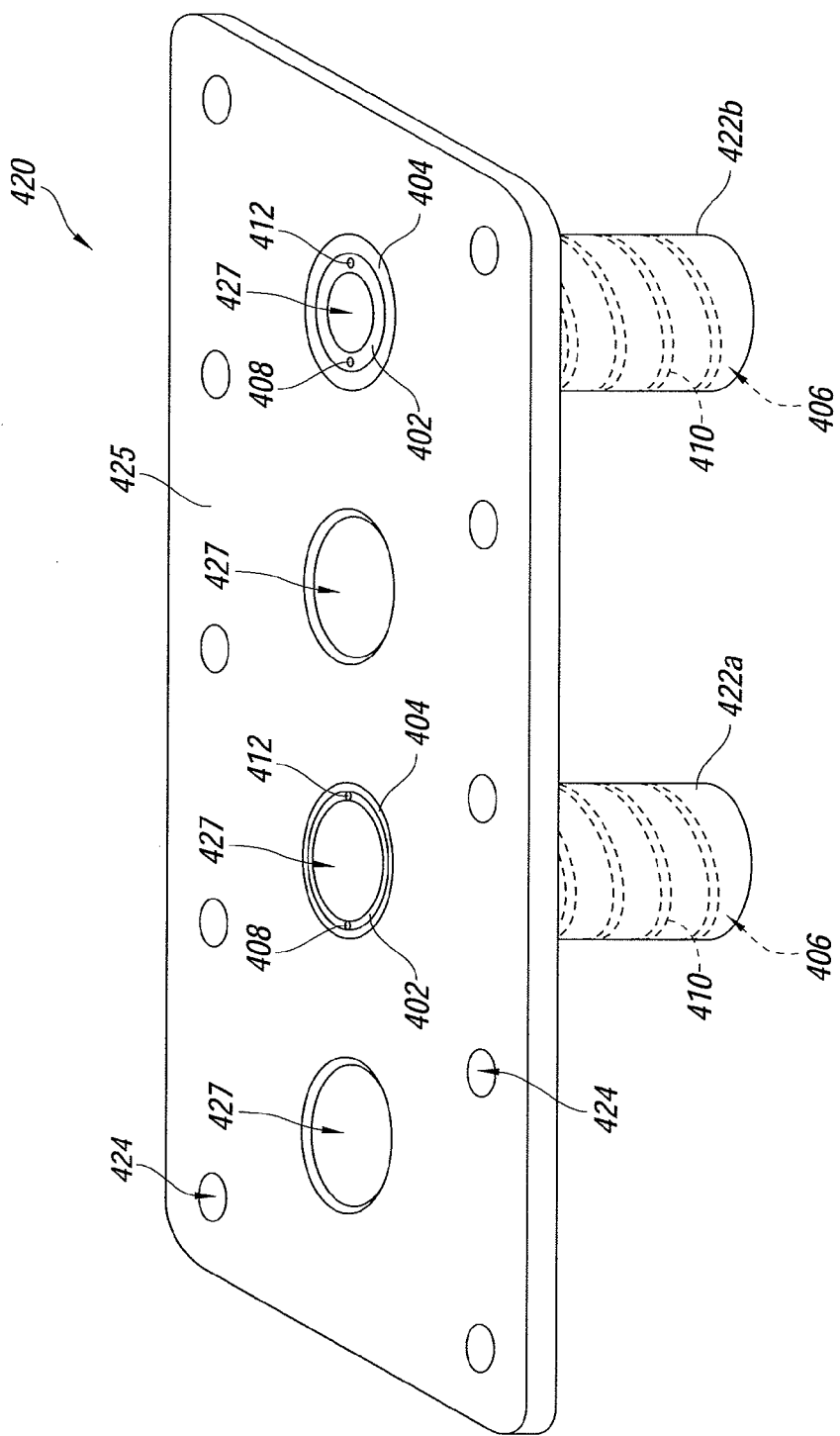

FIG. 4 is a partially schematic, isometric view of an insert assembly configured in accordance with an embodiment of the present technology.

DETAILED DESCRIPTION

The present technology includes various embodiments of inserts and insert kits for internal combustion engines, and systems and methods for the conversion of internal combustion engines to multi-stage compressors. Embodiments in accordance with the present technology can include inserts and insert kits for producing multi-stage compressors, such as the multi-stage compressors described in U.S. patent application Ser. No. 13/802,202, entitled "MULTI-STAGE COMPRESSORS AND ASSOCIATED SYSTEMS, PROCESSES AND METHODS," and filed on Mar. 13, 2013, which is incorporated by reference herein in its entirety.

Inserts in accordance with the present technology can convert one or more cylinders of an internal combustion engine to operate to compress gases, while one or more of the remaining cylinders can operate in a manner at least generally similar to that of a conventional internal combustion engine. For example, in one embodiment, an eight cylinder internal combustion engine can be converted to a multi-stage compressor having one, two, three, four, five or more cylinders configured for gas compression, and the remaining cylinders configured for conventional engine operation. Illustratively, in an exemplary embodiment, four cylinders are configured for conventional engine operation and provide power to drive pistons in four compression cylinders.

In several embodiments, a plurality of individual inserts can be positioned within corresponding individual cylinders of an internal combustion engine. For example, independent inserts can be separately inserted into corresponding cylinders. Embodiments in accordance with the present technology can also include insert assemblies having a plurality of attached inserts that can be simultaneously inserted into corresponding cylinders. Insert kits in accordance with the present technology can include: inserts, insert assemblies having multiple inserts, gaskets, adapters, fasteners, fluid lines, and/or other suitable mechanical, electrical and/or electromechanical components. Kits may include crankshafts, connecting rods, bearings, pistons, piston rings and related components to provide variation of the strokes through which compression occurs and may be combined with inserts that provide smaller diameter cylinders to produce the desired reduction of volume in one or more steps of multiple compression operations. Insert kits in accordance with the present technology may also include one or more components that are at least generally similar to those of a "Stroker kit" for modifying the displacement of an internal combustion engine.

FIG. 1 is a partially schematic, overhead view of a multi-stage compressor 100 configured in accordance with an embodiment of the present technology. For ease of reference, the multi-stage compressor 100 may be referred to as the compressor 100. Similarly, additional embodiments of multi-stage compressors described herein may also be generally referred to as compressors. In the illustrated embodiment, the compressor 100 includes an engine block 102 having four compression cylinders 104 (identified individually as compression cylinders 104a-104d) and four combustion cylinders 106 (identified individually as combustion cylinders 106a-106d). The engine block 102 is configured in a manner at least generally similar to a V-8 engine, and includes a first cylinder bank 108a and a second cylinder bank 108b (identified collectively as the cylinder banks 108). The compression cylinders 104 and the combustion cylinders 106 are evenly distributed between the cylinder banks 108. I.e., the first cylinder bank 108a and the second cylinder bank 108b each include two compression cylinders 104 and two combustion cylinders 106.

The compressor 100 can include a production system 109 having a variety of suitable components for the production and transport of gases, compressed gases and/or liquids. The production system 109 can include, for example, a production line 110 for transporting gas, compressed gas and/or liquids. For ease of reference, the use of the term gases and/or liquids herein can include one or more gases, compressed gases, liquids, and/or any combination of the same. In the illustrated embodiment, the production line 110 includes one or more conduits or tubes 116, and extends from an inlet 112 to an outlet 114. The tubes 116 can be operably coupled to the compression cylinders 104 and/or other components. A coolant system 117 can be operably coupled to the production system 109 via a plurality of heat exchangers 124 (identified individually as a first heat exchanger 124a through a fourth heat exchanger 124d). The coolant system 117 can include a coolant line 118 for the circulation of coolant, and can extend from an inlet 120, through the heat exchangers 124, to an outlet 122. The heat exchangers 124 can be positioned along the production line 110, such that the gas and/or liquids in the production line 110 and the coolant in the coolant line 118 flow through the heat exchangers 124 to effect a transfer of heat. The coolant system 117 can include a variety of additional suitable components. For example, the coolant system 117 can include: heat sinks, expansion valves, expansion motors, heat exchangers, flow control valves, thermostats, pumps, evaporators, condensers, etc. In some embodiments, the coolant system 117 can flow coolant in a loop, while in other embodiments, the coolant system 117 can flow coolant from a coolant source to a heat reservoir. In several embodiments, phase change cooling is provided such as phase change from solid to liquid by materials such as paraffin or sodium sulfate, or phase change from liquid to gas by substances such as water or ammonia at appropriately provided partial pressures to control the temperature of evaporation. Liquid phase change coolant may be returned to the heat removal pathway by gravity or by a pump impetus from a suitable heat rejection condenser.

FIG. 2A is a partially schematic, cross-sectional side view of a portion of the compressor 100 taken along the line 2A of FIG. 1. In the illustrated embodiment, the compression cylinder 104a includes a compression piston 210a, and the combustion cylinder 106a includes a combustion piston 211. The compression piston 210a and the combustion piston 211 are operably connected to a crankshaft 202 via a crank pin 203 and connecting rods 204. Pistons in accordance with the present technology may be articulated at a variety of suitable crank angles and throws for various purposes. For example, crank angles and throws can be adjusted to "smooth" the operation of the compressor 100 and balance one or more moving components of the compressor 100. Similarly the V-banks of the compressor 100 may be disposed at a variety of suitable angles.

FIG. 2B is a partially schematic, cross-sectional side view of a portion of the compressor 100 taken along the line 2B of FIG. 1. Similar to the compression cylinder 104a and the compression piston 210a of FIG. 2A, the compression cylinders 104b-104d include corresponding compression pistons 210b-210d, respectively. The compression pistons 210a-210d (identified collectively as the compression pistons 210) are also operably coupled to the crankshaft 202 via connecting rods 204. The crankshaft 202 is driven by combustion pistons 211 positioned in the combustion cylinders 106, as shown in FIG. 2A. Inlet valves 205 can be positioned adjacent each of the compression cylinders 104 to provide for the inlet of gases to the compression cylinders 104. Similarly, outlet valves 207 can be positioned adjacent each of the compression cylinders 104 to provide for the outlet of gases and/or liquids from the compression cylinders 104. The inlet valves 205 and the outlet valves 207 can be operated via a variety of suitable pneumatic, hydraulic, mechanical, electrical and/or electromechanical devices. For example, one or more camshafts, with or without connective linkages such as rocker arms or pushrods, can be positioned to operate the inlet valves 205 and the outlet valves 207.

The compression cylinders 104b-104d include a first cylindrical insert 206a, a second cylindrical insert 206b and a third cylindrical insert 206c (identified collectively as the inserts 206) that progressively reduce an internal volume of the corresponding individual compression cylinders 104b-104d, respectively. For example, the first insert 206a can include a first inside diameter $D_1$ that reduces the internal volume of the compression cylinder 104b by a first amount; the second insert 206b can include a second inside diameter $D_2$, smaller than the first inside diameter $D_1$, that reduces the internal volume of the compression cylinder 104c by a second amount, greater than the first amount; and the third insert 206c can include a third inside diameter $D_3$, smaller than the first and second inside diameters, that reduces the internal volume of the compression cylinder 104d by a third amount, greater than the first and second amounts. Accordingly, positioning the inserts 206a-206c in the compression cylinders 104b-104d can produce a first volume for the compression cylinder 104b, a second volume for the compression cylinder 104c, and a third volume for the compression cylinder 104d, wherein the first volume is greater than the second volume and the second volume is greater than the third volume. The first inside diameter $D_1$, the second inside diameter $D_2$, and the third inside diameter $D_3$ can be selected to produce desired first, second, and third volumes for the compression cylinders 104b-104d, and corresponding desired compression ratios.

Additionally, the compression pistons 210a-210d can have corresponding decreasing diameters and volumes to fit within their respective compression cylinders 104. For example, the first compression piston 210a can have a first piston diameter $PD_1$, the second compression piston 210b can have a second piston diameter $PD_2$, the third compression piston 210c can have a third piston diameter $PD_3$, and the fourth compression piston 210d can have a fourth piston diameter $PD_4$, wherein the piston diameters $PD_1$-$PD_4$ are progressively smaller. Although the illustrated embodiment includes the inserts 206 in three of the four compression cylinders 104, in other embodiments more or fewer compression cylinders may include inserts.

The production line 110 can be operably coupled to a storage tank 208 to store gases and/or liquids for later use. For example, in the illustrated embodiment of FIG. 2B, the outlet 114 of the production line 110 is directly coupled to the storage tank 208. The storage tank 208 can include a variety of suitable containers, for example, composite cylinders such as those disclosed U.S. Pat. Nos. 6,446,597; 6,503,584; and 7,628,137. The storage tank 208 is schematically illustrated in FIG. 2, but it is to be understood that the storage tank 208 and/or associated systems can include a variety of suitable components, including: liners, reinforcing wraps, flow valves, pressure relief valves, controllers, etc.

Referring to FIGS. 1, 2A and 2B together, in operation, a combustible fuel (e.g., gasoline, diesel, natural gas, etc.) is ignited in the combustion cylinders 106 to drive the combustion pistons 211 and rotate the crankshaft 202. The combustion cylinders 106 and combustion pistons 211 can operate in a variety of engine cycles (e.g., two-stroke operation, four-stroke operation, etc.). Rotation of the crankshaft 202 drives the compression pistons 210 to reciprocate within the compression cylinders 104. During each rotation of the crankshaft, each of the inlet valves 205 and the outlet valves 207 can open and shut at least once in a coordinated manner to move gas (e.g., air, natural gas, propane, etc.) through the production line 110 and through each of the compression cylinders 104. More specifically, the gas can be directed into the inlet 112 of the production line 110 and through the inlet valve 205 of the first compression cylinder 104a. The rotation of the crankshaft 202 moves the compression piston 210a downward in the compression cylinder 104a admitting the gas into the compression cylinder 104a. As the crankshaft 202 continues to rotate, the inlet valve 205 of the compression cylinder 104a is closed and the compression piston 210a reverses direction, compressing the gas in a first stage of compression. As the compression piston 210a approaches top dead center, the outlet valve 207 can open, directing the pressurized gas into the production line 110 and toward the compression cylinder 104b.

In a manner at least generally similar to the compression cylinder 104a, each of the compression cylinders 104b-104d can further compress the gas in a second through a fourth stage of compression. At each corresponding stage of compression, the decreased volume produced by the inserts 206 in the compression cylinders 104b-104d produces an increase in pressure. For example, the second compression piston 210b compresses the gas to a first volume and the third compression piston 210c compresses the gas to a second volume, smaller than the first volume.

The heat exchangers 124 can cool the gases and/or liquids as they are transported through the production line 110. In the illustrated embodiments of FIGS. 1 and 2B, there is a corresponding heat exchanger 124 that follows each stage of compression. In other embodiments, additional or fewer heat exchangers 124 may be employed. Additionally, in the illustrated embodiment, coolant flows through the heat exchangers 124 in a direction that is opposite to the flow of the gases and/or liquids. That is, the coolant passes through the fourth heat exchanger 124d first, and passes through the first heat exchanger 124a last. In other embodiments, the coolant can flow through the heat exchangers 124 in the same direction as that of the gases and/or liquids. Regardless of the direction of coolant flow, the combination of the temperature of the provided coolant and the pressure generated by the multistage compression can compress and/or liquefy gases that are transported through the production line 110.

The inserts 206 can facilitate the compression of a variety of suitable gases to produce compressed gas and or liquids. For example, in some embodiments, the inserts 206 can facilitate the compression of natural gas by the compressor 100 to produce compressed natural gas. The inserts 206 can also facilitate the compression of a variety of other gases, including air, hydrogen, propane, nitrogen, oxygen, helium, waste gases, etc. Additionally, inserts in accordance with the present technology can be configured to facilitate the liquefaction of gases in manners described in U.S. patent application Ser. No. 13/797,869, entitled "LIQUEFACTION SYSTEMS AND ASSOCIATED PROCESSES AND METHODS," filed on Mar. 12, 2013, which is incorporated by reference herein in its entirety.

FIG. 3A is a partially schematic cross-sectional view of an insert 300 configured in accordance with an embodiment of the present technology. FIG. 3B is an isometric view of the insert 300 of FIG. 3A. Referring to FIGS. 3A and 3B together, the insert 300 can be at least generally similar to the inserts 206 of FIGS. 2A and 2B and can be configured to be positioned within the compression cylinders 104 of the compressor 100. In the illustrated embodiment, the insert 300 includes an inner annular cylinder 302 and an outer annular cylinder 304. The inner annular cylinder 302 can be thermally conductive and positioned to transmit heat to other components of the compressor 100. For example, the inner annular cylinder 302 can be a thermally conductive metal or metal alloy that can be positioned to transmit heat away from the compression cylinder 104 via suitable methods such as contact with a suitably cooled cylinder head. The inner annular cylinder 302 can also include additional and/or alternative cooling features. In the illustrated embodiment, the inner annular cylinder 302 includes a coolant channel 306 within the insert 300 that extends from an inlet 308 through a suitable coolant circulation system such as a plurality of passageways such as one or more helical coils 310 to an outlet 312. The coolant channel 306 can be independent of or integral with the coolant system 117. For example, in one embodiment, the coolant channel 306 can be operably coupled to the coolant line 118. Coolant flowing through the coolant channel 306 can remove heat from the inner annular cylinder 302, cooling the compression cylinders 104 and any gases and/or liquids therein, including at the time heat of compression is generated. Such immediate heat removal can improve the efficiency of the compression process. Additionally, the coolant channel 306 can be integral with a thermochemical regeneration (TCR) system, such as those described in U.S. Patent Application No. 61/304,403, entitled "COUPLED THERMOCHEMICAL REACTORS AND ENGINES, AND ASSOCIATED SYSTEMS AND METHODS," and filed Feb. 14, 2011, the entirety of which is incorporated by reference herein. In such embodiments, heat removed from the compression cylinders 104 can be used to enhance the efficiency and/or reduce the emissions of the compressor 100.

Gas compressed within the compression cylinders 104 can be mixed and/or stratified by cooling provided by the inserts 300. For example, as the inserts 300 are cooled by the circulation of coolant within the inner annular cylinders 302, the compressed gas can be circulated to stratify within the compression cylinders 104, with the cooled gas moving toward the inner portion of the associated compression cylinder 104. All real gases (except hydrogen, helium and neon) are heated by such compression and such heat is transferred during compression to compression chamber components and/or coolant in passageways surrounding the compression stroke of each compression piston. Additionally, the insert 300 can include components that can induce a swirl to gases that are introduced to a compression cylinder. For example, a directing fin 305 can be attached to, coupled to, or integral with the inner annular cylinder 302 and can induce a swirl to gases, as further described in U.S. patent application Ser. No. 13/802,202, entitled "MULTI-STAGE COMPRESSORS AND ASSOCIATED SYSTEMS, PROCESSES AND METHODS," which was incorporated by reference above. Furthermore, the coolant channel 306 can extend through the fin 305 to aid in cooling gases injected into a compression cylinder.

Although the fin 305 of the illustrated embodiment is positioned to extend around only a portion of the inner annular cylinder 302, directing fins in accordance with the present technology can extend around a greater or smaller portion of the inner annular cylinder 302. In several embodiments, a directing fin can encircle the internal circumference of the inner annular cylinder 302. Furthermore, multiple directing fins 305 can be utilized, including one or more directing fins 305 positioned within one or more compression cylinders of a compressor.

The outer annular cylinder 304 can be thermally insulative and positioned to prevent the transmission of heat from the compression cylinders 104 to other components of the compressor 100 (e.g., the cylinder banks 108 or the crank case). For example, the outer annular cylinder 304 can include ceramics, carbon, aramid fibers (e.g., Kevlar®), and/or other insulative materials, and can at least partially encircle the inner annular cylinder 302 to reduce the transmission of heat to the compressor 100. Insulating the compressor 100 from the heat generated within the compression cylinders 104 can provide multiple benefits. In some embodiments, reducing the heat transmitted to the compressor 100 can increase the heat available for utilization in related operations such as a TCR system. Additionally, reducing the heat transmitted to the compressor 100 can decrease negative effects that high temperatures can have on mechanical and/or electrical components.

FIG. 4 is an isometric view of an insert or insert assembly 420 configured in accordance with an embodiment of the present technology. In the illustrated embodiment, the insert assembly 420 includes a plate 425 having a plurality of cylinder openings 427. A first insert or insert sleeve 422a and a second insert or insert sleeve 422b (identified collectively as insert sleeves 422) can be coupled to, attached to, or integral with the plate 425 at corresponding cylinder openings 427. The insert sleeves 422 can be at least generally similar to the inserts 300 of FIGS. 3A and 3B. For example, the insert sleeves 422 can include inner annular cylinders 402 and outer annular cylinders 404. The inner annular cylinders 402 can include coolant channels 406 that extend from inlets 408 through a plurality of coils 410 to outlets 412. The plate 425 can further include a plurality of bolt holes 424 that can align with a bolt pattern on an engine block. In several embodiments, one or more insert assemblies 420 can be positioned within an engine to convert the engine to include operation as a compressor. For example, in one embodiment, the compressor 100 can be constructed by positioning the insert assembly 420 in the first cylinder bank 108a, with the first insert sleeve 422a within the second compression cylinder 104b and the second insert sleeve 422b within the fourth compression cylinder 104d. A second insert assembly that includes an insert sleeve appropriately sized for the second cylinder bank 108b can be installed therein. The engine heads can then be installed with bolts positioned to extend through the bolt holes 424. In several embodiments, the insert assembly 420 can function as a gasket that seals the compression and combustion cylinders of a compressor. For example, the plate 425 can match the shape of a head gasket in an engine and can therefore replace the head gasket.

From the foregoing, it will be appreciated that specific embodiments of the invention have been described herein for purposes of illustration, but that various modifications may be made without deviating from the spirit and scope of the various embodiments of the invention. For example, several embodiments may include various suitable combinations of components, devices and/or systems from any of the embodiments described herein. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

I claim:

1. An insert kit for converting an internal combustion engine to a multi-stage compressor, the insert kit comprising:
   a first insert having a first inside diameter and configured to be positioned at least partially within a first compression cylinder of the engine to reduce the volume of the first compression cylinder by a first amount, wherein the first insert comprises a thermally conductive inner annular cylinder made of a first material and a thermally insulative outer annular cylinder made of a second material different from the first material and at least partially encircling the inner annular cylinder;
   a directing fin coupled to the first insert, wherein the directing fin is configured to induce a swirl to a gas injected into the first compression cylinder;
   a coolant channel within the first insert, wherein the coolant channel is configured to cool the gas, and wherein the directing fin and the coolant channel operate to stratify the gas such that a first portion of the gas positioned toward the center of the first insert is at a first temperature, and a second portion of the gas positioned radially outward from the first portion is at a second temperature, higher than the first temperature;
   a second insert having a second inside diameter, smaller than the first inside diameter, and configured to be positioned at least partially within a second compression cylinder of the engine to reduce the volume of the second compression cylinder by a second amount, greater than the first amount;
   a first compression piston configured to be positioned within the first insert to compress the gas to a first gas volume;
   a second compression piston configured to be positioned within the second insert to compress the gas to a second gas volume, smaller than the first gas volume; and
   a production line for producing compressed gas, the production line including one or more conduits positioned to transport compressed gas between the first insert and the second insert.

2. The insert kit of claim 1, further comprising a plate having a plurality of cylinder openings, wherein the first insert and the second insert are coupled to corresponding individual cylinder openings.

3. The insert kit of claim 2, wherein the plate includes a plurality of bolt holes configured to align with a bolt pattern of the engine.

4. The insert kit of claim 2, wherein the plate is configured to replace a head gasket in the engine.

5. An insert kit for an internal combustion engine, the insert kit comprising:
   a plate having a plurality of cylinder openings positioned to align with cylinders of the internal combustion engine;
   a first insert sleeve having a first inside diameter, the first insert sleeve attached to the plate at a first cylinder opening and configured to be positioned at least partially within a first cylinder of the internal combustion engine, wherein the first insert sleeve includes—
      a thermally conductive inner annular cylinder made of a first material and having a coolant channel;
      a thermally insulative outer annular cylinder made of a second material different from the first material; and a directing fin positioned within the first insert sleeve and shaped to induce a swirl to a gas injected into the first insert sleeve, wherein the directing fin and the coolant channel operate to stratify the gas such that a first portion of the gas positioned toward the center of the first insert sleeve is at a first temperature, and a second portion of the gas positioned radially outward from the first portion is at a second temperature, higher than the first temperature;

a second insert sleeve having a second inside diameter, smaller than the first inside diameter, the second insert sleeve attached to the plate at a second cylinder opening and configured to be positioned at least partially within a second cylinder of the internal combustion engine; and a production line for producing a compressed gas, the production line including one or more conduits positioned to transport the compressed gas between the first insert sleeve and the second insert sleeve.

6. The insert kit of claim 5, further comprising a first compression piston having a first piston diameter substantially similar to the first inside diameter, and a second compression piston having a second piston diameter substantially similar to the second inside diameter.

7. The insert kit of claim 5, further comprising a coolant system operably coupled to the production line via a heat exchanger, wherein the heat exchanger is configured to transfer heat from the compressed gas to a coolant.

8. The insert kit of claim 5 wherein the plate is shaped to at least partially match a head gasket of the internal combustion engine.

9. The insert kit of claim 5 wherein the plate is a first plate configured to be coupled to a first cylinder bank of the internal combustion engine, the insert kit further comprising a second plate having an attached third insert sleeve and an attached fourth insert sleeve, wherein the second plate is configured to be coupled to a second cylinder bank of the internal combustion engine.

* * * * *